(12) United States Patent
Tai et al.

(10) Patent No.: US 7,180,278 B2
(45) Date of Patent: Feb. 20, 2007

(54) REAL CURRENT SENSE APPARATUS FOR A DC-TO-DC CONVERTER

(75) Inventors: Liang-Pin Tai, Tainan (TW); Jiun-Chiang Chen, Houli Township, Taichung County (TW)

(73) Assignee: Richtek Technology Corp., Hsinchu (TW)

( * ) Notice: Subject to any disclaimer, the term of this patent is extended or adjusted under 35 U.S.C. 154(b) by 204 days.

(21) Appl. No.: 11/090,179

(22) Filed: Mar. 28, 2005

(65) Prior Publication Data

US 2005/0219926 A1    Oct. 6, 2005

(30) Foreign Application Priority Data

Mar. 30, 2004    (TW) ............................. 93108605 A

(51) Int. Cl.
    *G05F 1/40*    (2006.01)

(52) U.S. Cl. ..................................... 323/280; 323/277
(58) Field of Classification Search ................ 323/222, 323/225, 273, 274, 275, 276, 277, 280, 224
See application file for complete search history.

(56) References Cited

U.S. PATENT DOCUMENTS 6,765,372 B2 *   7/2004   Isham ........................ 323/224
7,102,337 B2 *   9/2006   Wheeler et al. ............ 323/225

* cited by examiner

*Primary Examiner*—Jessica Han
(74) *Attorney, Agent, or Firm*—Rosenberg, Klein & Lee

(57) ABSTRACT

A real current sense apparatus for a DC-to-DC converter uses a current mirror composed by two JFETs to mirror the output current of the converter to generate a temperature-independent mirror current to further generate a current sense signal. Due to the temperature-independence of the mirror current, the current sense signal is also temperature-independent.

6 Claims, 4 Drawing Sheets

REAL CURRENT SENSE APPARATUS FOR A DC-TO-DC CONVERTER

FIELD OF THE INVENTION

The present invention is related generally to a DC-to-DC converter and more particularly, to a real current sense apparatus for a DC-to-DC converter.

BACKGROUND OF THE INVENTION

DC-to-DC converters have been widely used in various power supply circuits. In a multi-phase buck converter, for example, each phase typically switches a pair of Metal-Oxide-Semiconductor Field-Effect Transistors (MOSFETs) connected between an input voltage and ground GND to generate a phase output. To stabilize and balance the phase outputs of the converter, the output voltage of the converter and the phase currents generated by the phases are fed back to the control circuit of the converter to generate optimized signals to manipulate the MOSFETs. For the feedback of each phase current, a current sense apparatus is used to sense each phase current, for example in the circuit proposed in U.S. Pat. No. 6,246,220 to Isham et al., a current feedback resistor is used to generate a current sense signal fed back to the control circuit thereof. Since the control to each phase is derived from the current sense signal generated by the current sense apparatus for the respective phase, the accuracy of the current sense signal will directly influence the balance between the phases of the converter and the performance of the converter.

FIG. 1 shows a conventional current sense apparatus for a single phase of a DC-to-DC converter 10, which comprises a pair of MOSes 102 and 104 connected between an input voltage Vcc and ground GND, and a control circuit 106 to switch the MOSes 102 and 104 to generate an output current $I_O$ flowing through an inductor L and a current sense resistor $R_S$ to charge a capacitor C to generate an output voltage Vout. Upon the output current $I_O$ flowing through the current sense resistor $R_S$, the voltage generated across the current sense resistor $R_S$ is $$V_S = I_O \times R_S, \qquad [\text{EQ-1}]$$

where $R_S$ represents the resistance of the parasitic resistor of the inductor L. To sense the output current $I_O$, a transconductive amplifier 108 is connected across the current sense resistor $R_S$ by its inverting input and non-inverting input, and a resistor $R_X$ is connected between the current sense resistor $R_S$ and the inverting input of the transconductive amplifier 108 for the virtual ground between the inverting input and the non-inverting input of the transconductive amplifier 108, to generate the same voltage $V_S$ across the resistor $R_X$. Therefore, the current sense signal between the output and the inverting input of the transconductive amplifier 108 is $$I_X = \frac{V_S}{R_X}. \qquad [\text{EQ-2}]$$

From the equations EQ-1 and EQ-2, it is obtained $$I_X = \frac{I_O \times R_S}{R_X}. \qquad [\text{EQ-3}]$$

By sampling and holding the current sense signal $I_X$ by a sample and hold circuit 110, it is generated a control signal $$I_S = k \times I_X = k \times \frac{I_O \times R_S}{R_X}, \qquad [\text{EQ-4}]$$

where k is a constant, and accordingly, the control circuit 106 regulates the output current $I_O$ by switching the MOSes 102 and 104.

However, after the converter 10 operates for a time period, the temperature of the current sense resistor $R_S$ increases, such that the resistance of the current sense resistor $R_S$ changes. From the equation EQ-3, the current sense signal $I_X$ is proportional to the resistance of the current sense resistor $R_S$, and therefore the accuracy of the current sense signal $I_X$ is degraded, thereby causing the control circuit 106 operating improperly.

FIG. 2 shows another conventional current sense apparatus for a single phase of a DC-to-DC converter 20, in which the inverting input and the non-inverting input of the transconductive amplifier 108 are connected to the source and the drain of the low-side MOS 104, respectively. When the output current $I_O$ flows through the low-side MOS 104, due to the internal resistance $R_{ds}$ of the low-side MOS 104, the voltage generated across the low-side MOS 104 is $$V_S = I_O \times R_{ds}, \qquad [\text{EQ-5}]$$

and from the equations EQ-2 and EQ-5, the current sense signal is $$I_X = \frac{I_O \times R_{ds}}{R_X}. \qquad [\text{EQ-6}]$$

By sampling and holding the current sense signal $I_X$ by the sample and hold circuit 110, the control signal is $$I_S = k \times I_X = k \times \frac{I_O \times R_{ds}}{R_X}, \qquad [\text{EQ-7}]$$

where k is a constant. The control circuit 106 regulates the output current $I_O$ by switching the MOSes 102 and 104 based on the control signal $I_S$.

Likewise, after the converter 20 operates for a time period, the temperature of the low-side MOS 104 increases, such that the internal resistance $R_{ds}$ of the low-side MOS 104 changes, and the control circuit 106 will operate improperly.

Therefore, it is desired a temperature-independent current sense apparatus.

SUMMARY OF THE INVENTION

One object of the present invention is to provide a real current sense apparatus for a DC-to-DC converter to sense the output current of the converter to thereby generate a temperature-independent current sense signal.

For a DC-to-DC converter including a high-side switch connected between an input voltage and a phase node and a control circuit to switch the high-side switch, according to one embodiment of the present invention, a real current sense apparatus comprises a first Junction Field-Effect Transistor (JFET) connected to the phase node for serving as a low-side switch to be switched by the control circuit to conduct an output current, a second JFET connected to the first JFET for forming a current mirror to mirror the output current to thereby generate a mirror current preferably proportional to the output current, and a transconductive amplifier for amplifying the mirror current to thereby generate a current sense signal. A sample and hold circuit is further comprised in the real current sense apparatus for sampling and holding the current sense signal to generate a control signal for the control circuit to regulate the output current.

For a DC-to-DC converter including a low-side switch connected to a phase node and a control circuit to switch the low-side switch, according to another embodiment of the present invention, a real current sense apparatus comprises a first JFET connected between the phase node and an input voltage for serving as a high-side switch to be switched by the control circuit to conduct an output current, a second JFET connected to the first JFET for forming a current mirror to mirror the output current to thereby generate a mirror current preferably proportional to the output current, and a transconductive amplifier for amplifying the mirror current to thereby generate a current sense signal. A sample and hold circuit is further comprised in the real current sense apparatus for sampling and holding the current sense signal to generate a control signal for the control circuit to regulate the output current.

For the output current of the converter is determined by setting, and the mirror current is generated by mirroring the output current, the mirror current is temperature independent. Subsequently, the current sense signal is temperature independent, since it is generated from the temperature-independent mirror current.

BRIEF DESCRIPTION OF DRAWINGS

These and other objects, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 1:
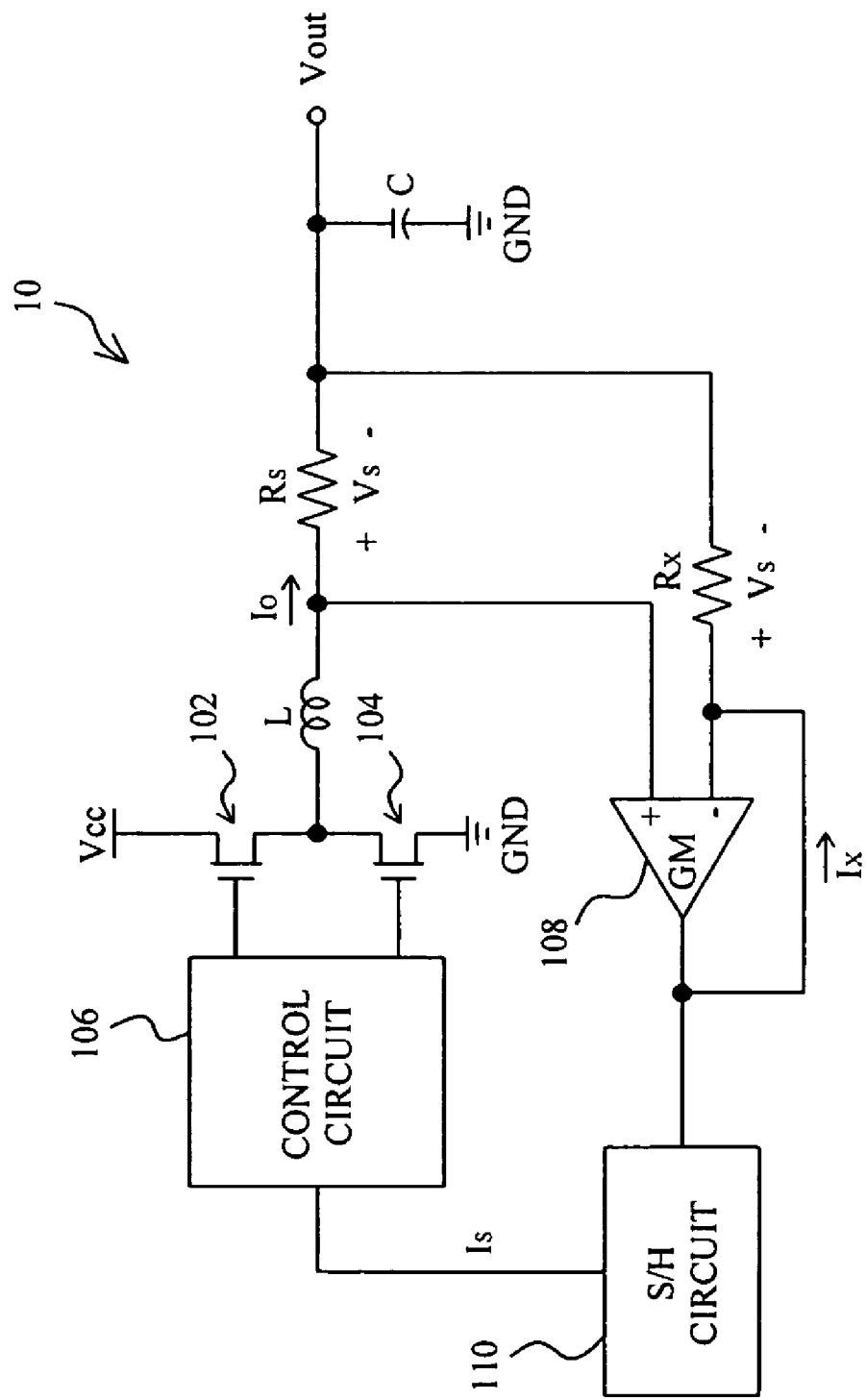
FIG. 1 shows a conventional current sense apparatus for a DC-to-DC converter.
Figure 2:
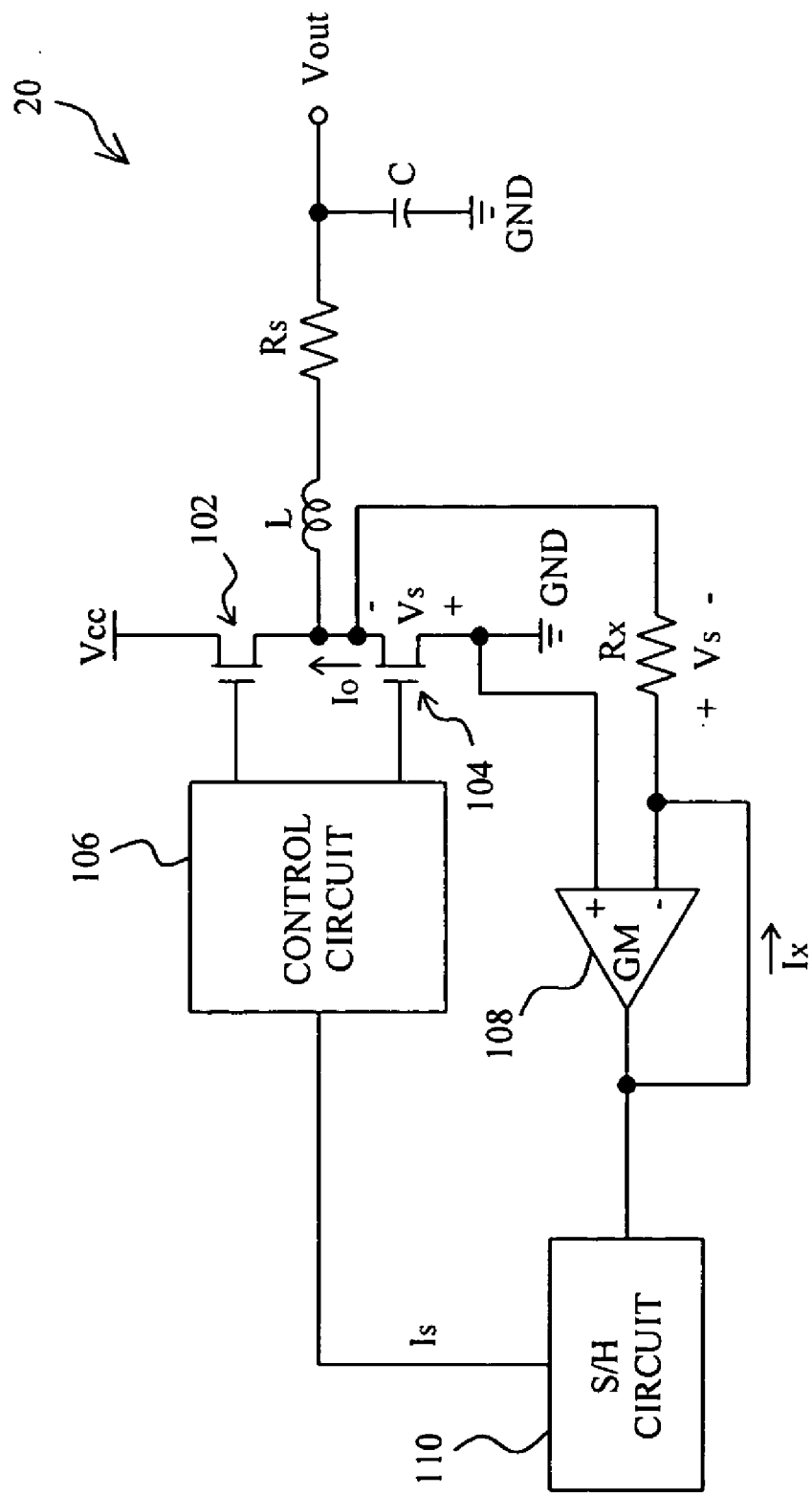
FIG. 2 shows another conventional current sense apparatus for a DC-to-DC converter.
Figure 3:
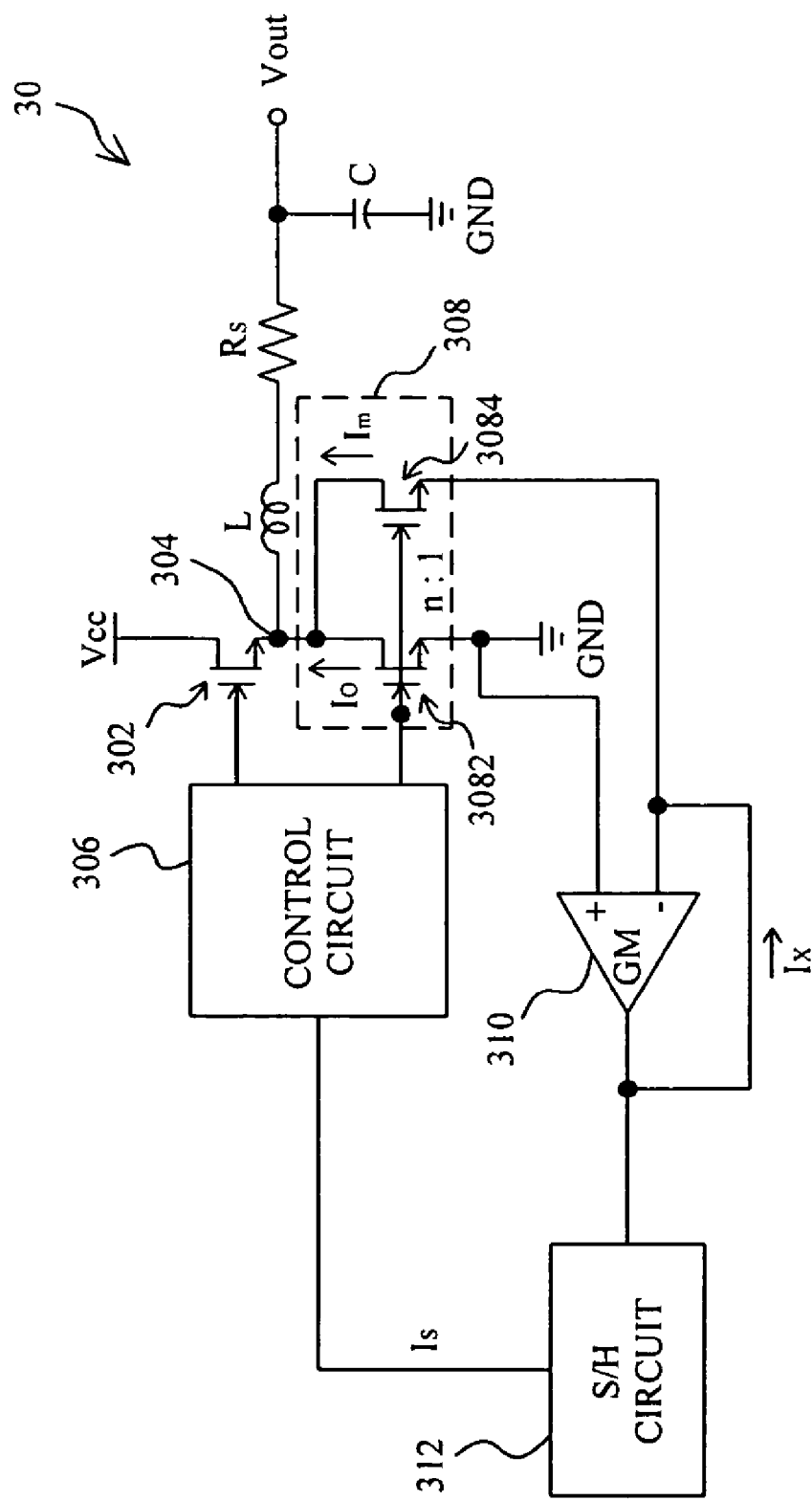
FIG. 3 shows a real current sense apparatus for a DC-to-DC converter according to one embodiment of the present invention.

FIG. 3 shows a real current sense apparatus in application of a DC-to-DC converter 30 according to one embodiment of the present invention. In the converter 30, a high-side JFET 302 is connected between an input voltage Vcc and a phase node 304 and is switched by a control circuit 306, and the output current $I_O$ of the converter 30 flows from the phase node 304 through an inductor L to charge a capacitor C to thereby generate an output voltage Vout. In FIG. 3, the resistor $R_S$ represents the parasitic resistor of the inductor L. To sense the output current $I_O$, the real current sense apparatus comprises a sense element 308 connected between the phase node 304 and ground GND. In the sense element 308, a JFET 3082 is connected between the phase node 304 and ground GND and serves as a low-side switch switched by the control circuit 306 to generate the output current $I_O$ in association with the high-side JFET 302, and a JFET 3084 is connected to the JFET 3082 to form a current mirror together with the JFET 3082 to mirror the output current $I_O$ flowing through the JFET 3082 to thereby generate a mirror current $I_m$. The JFETs 3082 and 3084 have a size ratio of n:1, and therefore $$Im = \frac{Io}{n}. \quad \text{[EQ-8]}$$

The real current sense apparatus further comprises a transconductive amplifier 310 to amplify the mirror current $I_m$ to thereby generate a current sense signal $I_X$. Due to the virtual ground between the inverting input and the non-inverting input of the amplifier 310, the current sense signal will be $$I_X = \frac{Io}{n}. \quad \text{[EQ-9]}$$

Furthermore, a sample and hold circuit 312 is used to sample and hold the current sense signal $I_X$ to generate a control signal $$Is = k \times I_X = k \times \frac{Io}{n}, \quad \text{[EQ-10]}$$

which is supplied to the control circuit 306 to regulate the output current $I_O$ by modulating the duties of the high-side JFET 302 and the low-side JFET 3082. In some other embodiments, the high-side JFET 302 is replaced with a MOS or other type of power switch. From the equation EQ-9, the current sense signal $I_X$ is temperature independent, and therefore the output current $I_O$ is accurately regulated.

Figure 4:
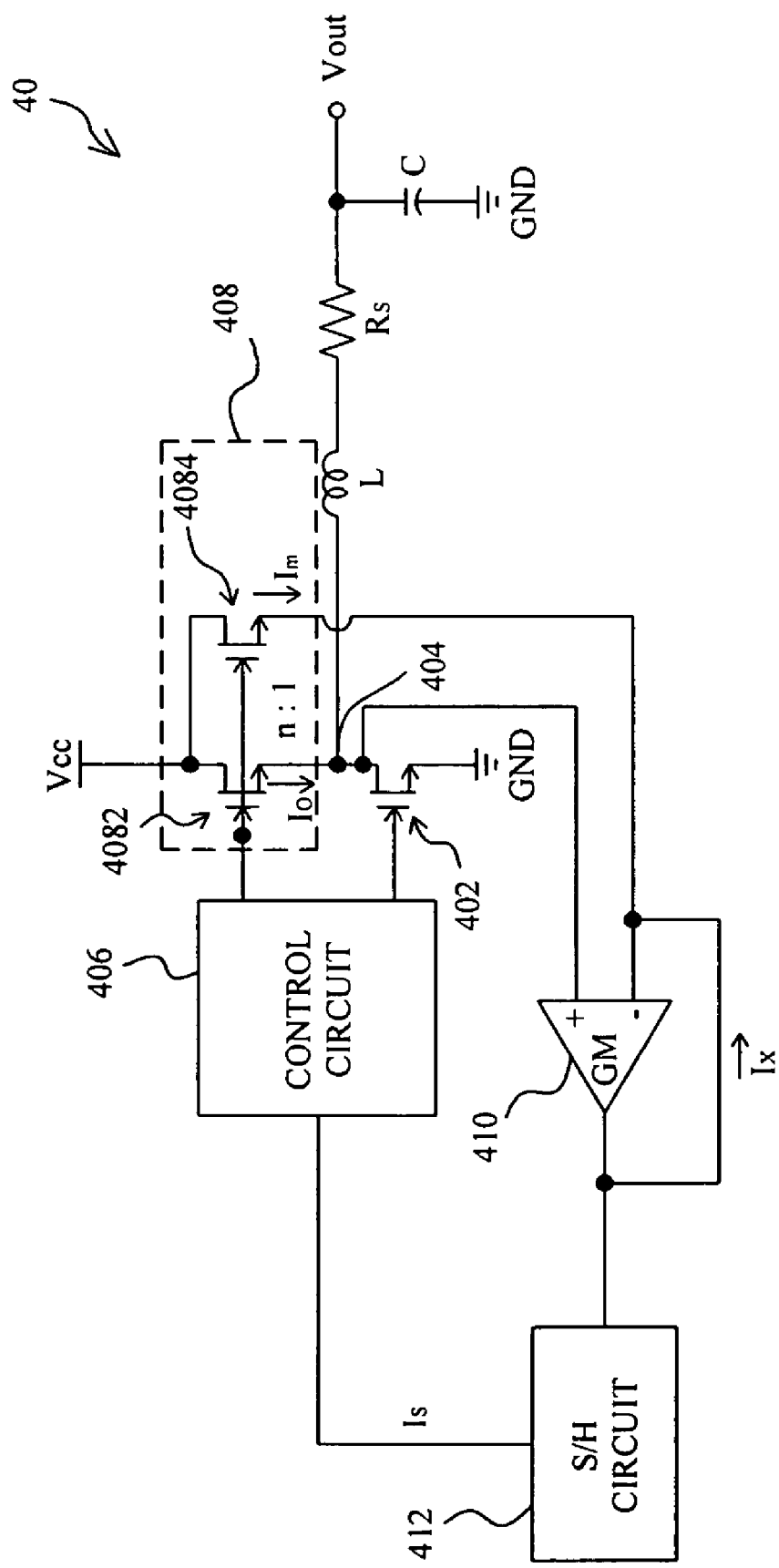
FIG. 4 shows a real current sense apparatus for a DC-to-DC converter according to another embodiment of the present invention.

FIG. 4 shows a real current sense apparatus in application of a DC-to-DC converter 40 according to another embodiment of the present invention. In the converter 40, a low-side JFET 402 is connected between a phase node 404 and ground GND and is switched by a control circuit 406, and the output current $I_O$ of the converter 40 flows from the phase node 404 through an inductor L to charge a capacitor C to thereby generate an output voltage Vout. Likewise, the resistor $R_S$ represents the parasitic resistor of the inductor L. To sense the output current $I_O$, the real current sense apparatus comprises a sense element 408 connected between an input voltage Vcc and the phase node 404. In the sense element 408, a JFET 4082 is connected between the input voltage Vcc and the phase node 404 to serve as a high-side switch switched by the control circuit 406 to generate the output current $I_O$ in association with the low-side JFET 402, and a JFET 4084 is connected to the JFET 4082 to form a current mirror together with the JFET 4082 to mirror the output current $I_O$ flowing through the JFET 4082 to thereby generate a mirror current $I_m$. Likewise, the mirror current $I_m$ is proportional to the output current $I_O$ as shown by the equation EQ-8, since the JFETs 4082 and 4084 have a size ratio of n:1. The mirror current $I_m$ is amplified by a transconductive amplifier 410 to thereby generate a current sense signal $I_X$ that is also proportional to the output current $I_O$ as shown by the equation EQ-9. The current sense signal $I_X$ is sampled and held by a sample and hold circuit 412 to generate a control signal $I_S$ having the value as shown by the equation EQ-10 for the control circuit 406 to regulate the output current $I_O$ by modulating the duties of the high-side JFET 4082 and the low-side JFET 402. In some other embodiments, the low-side JFET 402 is replaced with a MOS or other type of power switch.

Since the current sense signal $I_X$ is generated from the mirror current $I_m$, and the mirror current $I_m$ is generated by mirroring the output current $I_O$, the current sense signal $I_X$ will accurately represent the output current $I_O$.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A real current sense apparatus for a DC-to-DC converter including a high-side switch connected between an input voltage and a phase node, the real current sense apparatus comprising:

a first JFET connected to the phase node for serving as a low-side switch to conduct an output current;

a second JFET connected to the first JFET for forming a current mirror to mirror the output current to thereby generate a mirror current; and a transconductive amplifier for amplifying the mirror current to thereby generate a current sense signal.

2. The real current sense apparatus of claim 1, wherein the mirror current is proportional to the output current.

3. The real current sense apparatus of claim 1, further comprising a sample and hold circuit for sampling and holding the current sense signal.

4. A real current sense apparatus for a DC-to-DC converter including a low-side switch connected to a phase node, the real current sense apparatus comprising:

a first JFET connected between the phase node and an input voltage for serving as a high-side switch to conduct an output current;

a second JFET connected to the first JFET for forming a current mirror to mirror the output current to thereby generate a mirror current; and a transconductive amplifier for amplifying the mirror current to thereby generate a current sense signal.

5. The real current sense apparatus of claim 4, wherein the mirror current is proportional to the output current.

6. The real current sense apparatus of claim 4, further comprising a sample and hold circuit for sampling and holding the current sense signal.

* * * * *